United States Patent [19]
Sinko

[11] 3,821,969
[45] July 2, 1974

[54] PLUG

[75] Inventor: George M. Sinko, Royal Oak, Mich.

[73] Assignee: Underground Products, Inc., Livonia, Mich.

[22] Filed: May 31, 1972

[21] Appl. No.: 258,393

[52] U.S. Cl. ............................. 138/89, 138/96 R
[51] Int. Cl. ............................................. F16l 57/00
[58] Field of Search ............ 138/89, 92, 96 R, 96 T; 220/24 A, 42 B, 42 C, DIG. 19, 24.5; 215/47, 52, 48; 277/207, 208, 209, 210, 211, 212 R

[56] References Cited
UNITED STATES PATENTS

| | | | |
|---|---|---|---|
| 1,710,363 | 4/1929 | Kramer | 220/24 A |
| 2,873,765 | 2/1959 | Gregory | 138/96 R |
| 3,104,681 | 9/1963 | Gray, Jr. | 215/47 X |
| 3,148,798 | 9/1964 | Brown | 138/89 X |
| 3,574,312 | 4/1971 | Miller | 220/24.5 |

FOREIGN PATENTS OR APPLICATIONS

| | | | |
|---|---|---|---|
| 1,082,517 | 6/1954 | France | 215/48 |
| 669,282 | 12/1938 | Germany | 215/52 |
| 1,009,119 | 11/1965 | Great Britain | 215/52 |

*Primary Examiner*—Charles A. Ruehl
*Attorney, Agent, or Firm*—Hauke, Gifford, Patalidis & Dumont

[57] ABSTRACT

A universal-type plug for obturating an aperture of any size in a predetermined range, and which is made of a resilient, preferably hollow, generally tapered body peripherally provided with consecutive right cylindrical and frusto-conical surface portions, the right cylindrical surface portions being of progressively decreasing diameters from the larger end to the smaller end of the body to accommodate the various sizes of apertures that the plug is capable of closing.

5 Claims, 5 Drawing Figures

PATENTED JUL 2 1974  3,821,969

PLUG

BACKGROUND OF THE INVENTION

It is common practice to obturate an aperture, for example the open end of a pipe or conduit, with a tapered plug made of a soft or resilient material which is frictionally engaged into the aperture. As an example of typical application of such plugs, they may be used for obturating, permanently or temporarily, the end of a pipe or conduit which is to be buried underground, such pipe or conduit being commonly used for carrying and protecting electrical power lines, telephone lines and the like. The plug may be used for permanently closing the end of the pipe, or an aperture in the pipe, prior to filling up the trench in which the pipe is lowered or, alternately, the plug may be engaged in the open end of a pipe at the end of a work day to prevent moisture, water or dirt from being introduced into the pipe until work is resumed. At the beginning of the next shift, the plug is removed and additional lengths of pipe are laid in the trench.

Heretofore plugs have been generally made in the shape of a cup molded from a resilient material, such as a plastic, in the form of a frusto-conical body, such that a plug of a given nominal size is capable of obturating apertures of diverse sizes within a range, or the ends of a plurality of pipes or conduits of diverse internal diameters within a range. Such conventional plugs present the inconvenience that due to the relatively important taper of the peripheral surface of their body they tend to pop out of the aperture or pipe end in which they have been forcibly inserted, or, if they are driven too deeply into the aperture in order to prevent them from popping out, they may be damaged or become jammed in the aperture.

SUMMARY OF THE INVENTION

The present invention, by providing a plug having a body comprising a plurality of decreasing diameter substantially right cylindrical sections interjoined by frusto-conical portions disposed between two consecutive right cylindrical portions, has for its principal object to provide a universal-type plug capable of obturating an aperture of a diameter comprised within a given range. The plug of the invention securely obturates the aperture by way of a frictional and compressive engagement of a substantially right cylindrical surface of the plug body with the edge of the aperture or with the internal surface of a pipe bore proximate the open end of the pipe, as contrasted with prior art plugs presenting a small surface of engagement consisting of the deformed and flattened narrow portion of a frusto-conical surface.

The many objects and advantages of the present invention will become apparent to those skilled in the art when the best mode contemplated for practicing the invention is read in conjunction with the accompanying drawing.

BRIEF DESCRIPTION OF THE DRAWING

In the drawing, wherein like reference numerals refer to like or equivalent parts.

DETAILED DESCRIPTION OF THE PREFERRED EMBODIMENT

Figure 1:
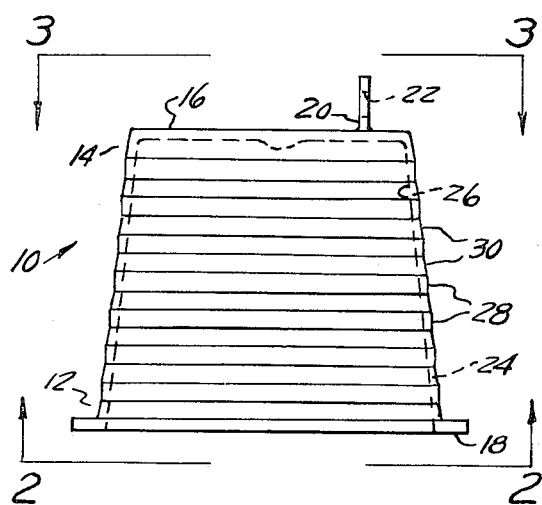
FIG. 1 represents an elevation view of a plug according to the present invention.
Figure 3:
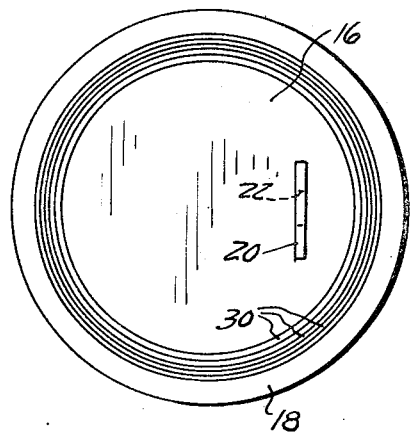
FIG. 3 is an end view thereof from line 3—3 of FIG. 1.
Figure 2:
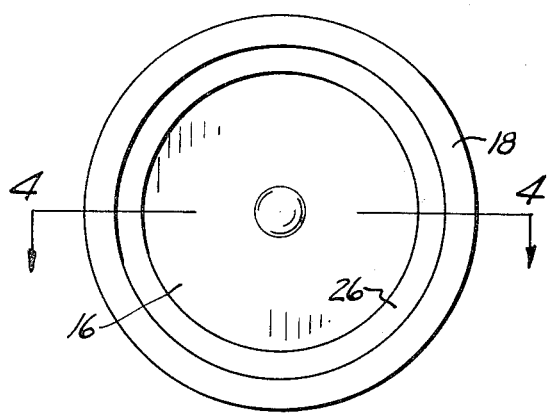
FIG. 2 is an end view thereof from line 2—2 of FIG. 1.
Figure 4:
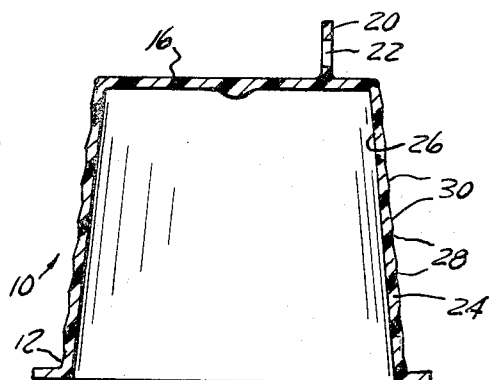
FIG. 4 is a sectional view thereof as seen from line 4—4 of FIG. 2.

As shown in FIGS. 1-4, a plug according to the present invention takes the form of a hollow body 10, substantially cup-shaped, and made of a relatively resilient plastic material, such as polyethylene or the like. The plug body 10 is generally frusto-conical, or tapered from its larger diameter open end 12 to its smaller diameter end 14 which is closed by an integral end wall 16.

The larger and open end of the plug body 10 is provided with an integral outwardly projecting radial flange 18, and the end wall 16 is provided, as shown, with an integral lug or bracket 20. The cup-shaped plug body 10 has a relatively thin wall 24 (FIG. 4), so as to be substantially resilient, the thin wall 24 forming on the interior of the plug a substantially smooth frusto-conical surface 26. The plug body 10 is peripherally shaped so as to form a plurality of successive substantially right cylindrical surfaces 28, a frusto-conical surface 30 being disposed between two successive right cylindrical surfaces 28. In this manner, the peripheral surface of the plug body 10 is defined by a series of such right cylindrical surfaces 28 of progressively decreasing diameters from the largest diameter portion 12 of the plug body to the smallest diameter portion 14 of the plug body 10.

Figure 5:
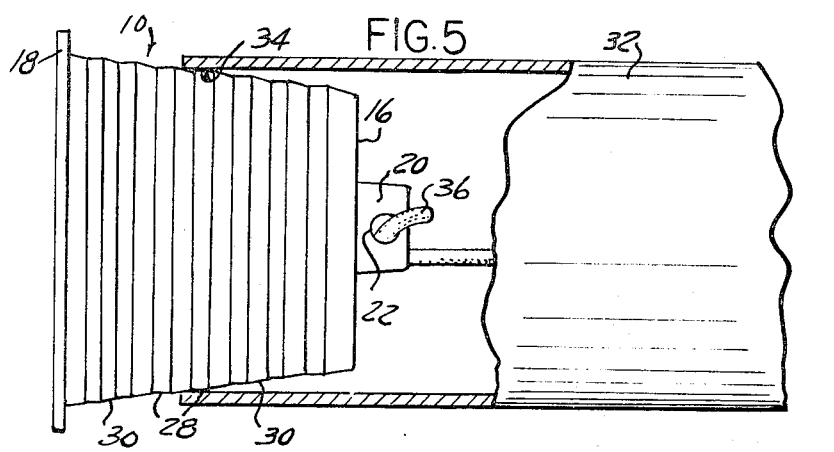
FIG. 5 is a schematic view showing the plug of FIGS. 1-4 in use for obturating the end of a conduit or pipe.

The plug of the invention is used to obturate an aperture of any diameter within a predetermined range. For example, a plug of the invention can be used, as schematically illustrated at FIG. 5, for closing the open end of a pipe or conduit, such as shown at 32, in a permanent or semi-permanent manner. Because the plug body 10 is made of a relatively resilient material, when the plug body 10 is forcibly pressed into the end of the pipe 32, the plug body 10 is caused to project within the pipe until a tight fit is obtained by frictional engagement between one of the right cylindrical surfaces 28 and the internal bore surface 34 of the pipe 32 proximate the edge of the open end thereof. The frusto-conical surface 30 on the periphery of the plug body 10, which is situated immediately forward of the particular right cylindrical surface 28 having an appropriate diameter permitting a relatively tight fit of such particular cylindrical surface 28 into the open end of the pipe 32, acts as a pilot surface and as a means for progressively and elastically compressing the plug periphery radially to enable the right cylindrical surface 28 to frictionally engage the surface of the bore 34 of the pipe 32 proximate the end thereof. The plug body 10 is thus forcibly pressed into the open end of the pipe 32 until the edge of the pipe engages the leading portion of the next proximate frusto-conical surface 30, thus preventing further engagement of the plug within the pipe end. It can thus be seen that the frictional engagement between the peripheral surface of the plug and the surface of the bore 34 of the pipe 32 is effected by way of substantial areas in engagement with each other, as contrasted with the limited area engagement resulting from using a conventional straight frustoconical plug for obturating the open end of a pipe.

The progressively decreasing diameters of the right cylindrical surfaces 28 have been experimentally determined as a function of the elasticity of the material used for molding the plug body 10 and of the thickness of the plug wall 24, such that a plug of a given nominal size is capable of securely obturating an aperture of any diameter within a given range. For example, a 4 in. nominal diameter plug molded of polyethylene, having a length of about 4 in. and a maximum wall thickness of 0.1 in., has a diameter at its largest end 12 about 1 in. larger than its diameter at its smallest end 14. Such a plug may be provided, for example, with seven right cylindrical surfaces 28, each about one-fourth in. wide and decreasing progressively, for example, from a diameter of 4.55 in. proximate the largest diameter end 12 of the plug to a diameter of 3.782 in. proximate its smallest diameter end 14. Each pair of consecutive right cylindrical surfaces 28 is separated by a frusto-conical surface 30, also approximately one-fourth in. wide and having a taper of 14° 22', such taper being measured relative to the longitudinal axis of the plug body. As will be obvious to those skilled in the art of molding, the right cylindrical surfaces 28 are also provided with a slight taper, or draft angle, of the order of approximately ½° to 1°, in order to facilitate extraction of the plug body from the mold. Such a draft angle is so small that, for all practical purposes, the surfaces 28 can be considered as being sections of a right cylinder between imaginary planes substantially at right angle to the longitudinal axis of the plug body.

The taper of the frusto-conical surfaces 30 is generally comprised between 10° and 20° and preferably between 12° and 15°, and the progressive increase in diameters of the right cylindrical surfaces 28 is generally of the order of 0.075 in. to 0.200 in. from one cylindrical surface to the next, and preferably of about 0.115 in. to 0.150 in. In the specific example of a 4 in. nominal plug, such a progression is of the order of 0.127 in.

As also illustrated at FIG. 5, electrical wires, cables and the like, which are already laid in the pipe 32, may conveniently be tied together by means of a rope or wire, the end 36 of which may be passed through the aperture 22 in the bracket or lug 20 integral with the bottom wall 16 of the plug body 10, and tied in a knot prior to inserting the plug body into the open end of the pipe 32. At the conclusion of a work shift, when a plurality of pipes 32 are temporarily obturated at their open end by means of the plug of the invention so as to prevent moisture, water and other debris from entering the pipes during the interruption of work, the end of cables or wires, which may have already been laid in the pipes, are thus secured such that they may be retrieved at the beginning of the next work shift.

The plug of the invention can be easily removed to again open a pipe end or an aperture, the flange 18 providing a good and convenient grasping means for pulling the plug free from its frictional engagement with the edge of the aperture or the internal bore of the pipe end.

Although the plug of the invention has been illustrated and described for illustrative purpose as being circular in cross section and made of plastic, it is obvious that the shape of the plug body is dictated by the shape of the aperture which the plug is designed to obturate and that metal may be used.

Having thus described the invention by way of a practical embodiment thereof, what is claimed as novel and sought to be protected by United States Letters Patent is as follows:

1. A universal-type plug for obturating an aperture within a predetermined range of aperture sizes, said plug comprising a generally tapered body made of substantially resilient material, said body being peripherally provided with alternate substantially right cylindrical surfaces and frusto-conical surfaces, each frusto-conical surface being disposed between two consecutive right cylindrical surfaces and the diameters of said right cylindrical surfaces progressively decreasing from one end of said body to the other, and a substantially axially projecting bracket disposed at the smaller end of said plug, said bracket being provided with an aperture.

2. The plug of claim 1 further comprising an outwardly projecting flange substantially radially disposed at the larger end thereof.

3. The plug of claim 1 wherein said frustoconical surfaces have a taper comprised between 10° and 20°.

4. The plug of claim 3 wherein said taper is comprised between 12° and 15°.

5. The plug of claim 1 wherein said body is substantially cup-shaped.

\* \* \* \* \*